United States Patent [19]

Zimmerman et al.

[11] Patent Number: 5,459,680
[45] Date of Patent: Oct. 17, 1995

[54] METHOD AND APPARATUS FOR SPUR-REDUCED DIGITAL SINUSOID SYNTHESIS

[75] Inventors: George A. Zimmerman, Rancho Palos Verdes; Michael J. Flanagan, Pasadena, both of Calif.

[73] Assignee: The United States of America as represented by the Administrator of the National Aeronautics and Space Administration, Washington, D.C.

[21] Appl. No.: 141,295

[22] Filed: Oct. 20, 1993

[51] Int. Cl.$^6$ .................................................. G06F 1/02
[52] U.S. Cl. .............................................. 364/721; 327/105
[58] Field of Search ................................. 364/721, 718; 328/14; 327/105, 106

[56] References Cited

U.S. PATENT DOCUMENTS

| | | |
|---|---|---|
| 4,652,832 | 3/1987 | Jasper . |
| 4,926,130 | 5/1990 | Weaver . |
| 4,994,803 | 2/1991 | Blackham . |
| 5,014,231 | 5/1991 | Reinhardt et al. . |
| 5,017,880 | 5/1991 | Dugan et al. . |
| 5,029,120 | 7/1991 | Brodeur et al. . |
| 5,036,294 | 7/1991 | McCaslin . |
| 5,073,869 | 12/1991 | Bjerede . |
| 5,091,921 | 2/1992 | Minami . |
| 5,108,182 | 4/1992 | Murphy . |
| 5,121,409 | 6/1992 | Goss . |
| 5,128,623 | 7/1992 | Gilmore . |
| 5,131,750 | 7/1992 | Gravel et al. . |
| 5,151,661 | 9/1992 | Caldwell et al. . |
| 5,162,746 | 11/1992 | Choshal . |
| 5,166,629 | 11/1992 | Watkins et al. . |
| 5,184,093 | 2/1993 | Itoh et al. . |

*Primary Examiner*—Tan V. Mai
*Attorney, Agent, or Firm*—John H. Kusmiss; Thomas H. Jones; Guy M. Miller

[57] ABSTRACT

A technique for reducing the spurious signal content in digital sinusoid synthesis. Spur reduction is accomplished through dithering both amplitude and phase values prior to word-length reduction. The analytical approach developed for analog quantization is used to produce new bounds on spur performance in these dithered systems. Amplitude dithering allows output word-length reduction without introducing additional spurs. Effects of periodic dither similar to that produced by pseudo-noise (PN) generator are analyzed. This phase dithering method provides a spur reduction of 6(M+1) dB per phase bit when the dither consists of M uniform variates. While the spur reduction is at the expense of an increase in system noise, the noise power can be made white, making the power spectral density small. This technique permits the use of a smaller number of phase bits addressing sinusoid look-up tables, resulting in an exponential decrease in system complexity. Amplitude dithering allows the use of less complicated multipliers and narrower data paths in purely digital applications, as well as the use of coarse-resolution, highly-linear digital-to-analog converters (DACs) to obtain spur performance limited by the DAC linearity rather than its resolution.

10 Claims, 7 Drawing Sheets

METHOD AND APPARATUS FOR SPUR-REDUCED DIGITAL SINUSOID SYNTHESIS

ORIGIN OF INVENTION

The invention described herein was made in the performance of work under a NASA contract, and is subject to the provisions of Public Law 96-517 (35 USC 202) in which the Contractor has elected not to retain title.

TECHNICAL FIELD

The present invention relates to a method and apparatus for adding a random noise sequence to the phase and/or amplitude representation of a digitally generated sinusoid to reduce the required number of bits without greatly increasing the spurious content. The invention is useful for generating spectrally pure digital sinusoids without employing a large number of bits in phase representation, which would otherwise result in exponentially large look-up tables, or, in amplitude representation which, in turn, would result in increasing the complexity of multiplications and in limiting the bandwidth of digital-to-analog conversion. The invention adds a random noise sequence to the phase and/or amplitude samples as appropriate, followed by a rounding or reduction of the number of bits originally in the representation. This addition of noise "dithers" the resulting phase and/or amplitude values, reducing the spurious signal content of the smaller wordlength representation.

BACKGROUND ART

It is well-known that adding a dither signal to a desired signal prior to quantization can render the quantizer error independent of the desired signal. Classic examples of this work deal with the quantization of analog signals. Advances in digital signal processing speed and large scale integration have led to the development of all-digital receiver systems, direct digital frequency synthesizers and direct digital arbitrary waveform synthesizers. In all these applications, because finite word-length effects are a major factor in system complexity, they may ultimately determine whether it is efficient to digitally implement a system with a particular set of specifications. Earlier work has presented a technique for reducing the complexity of digital oscillators through phase dithering with the claim of increased frequency resolution. Recent research has suggested mitigation of finite-word-length effects in the synthesis of oversampled sinusoids through noise shaping. It would be useful if the analysis techniques used for quantization of analog signals can be applied to overcome finite-word-length effects in digital systems. It would also be advantageous if appropriate dither signals can be used to reduce word lengths in digital sinusoid synthesis without suffering the normal penalties in spurious signal performance.

Conventional methods of digital sinusoid generation, e.g., FIG. 1, result in spurious harmonics (spurs) which are caused by finite word-length representations of both amplitude and phase samples. Because both the phase and amplitude samples are periodic sequences, their finite word-length representations contain periodic error sequences, which cause spurs. The spur signal levels are approximately 6 dB per bit of representation below the desired sinusoidal signal.

A search of the most relevant prior art resulted in the following U.S. Patents:

| | |
|---|---|
| 4,652,832 | Jasper |
| 4,926,130 | Weaver |
| 4,994,803 | Blackham |
| 5,014,231 | Reinhardt et al |
| 5,017,880 | Dugan et al |
| 5,029,120 | Brodeur et al |
| 5,036,294 | McCaslin |
| 5,073,869 | Bjerede |
| 5,091,921 | Minami |
| 5,108,182 | Murphy |
| 5,121,409 | Goss |
| 5,128,623 | Gilmore |
| 5,131,750 | Gravel et al |
| 5,151,661 | Caldwell et al |
| 5,162,746 | Ghoshal |
| 5,166,629 | Watkins et al |
| 5,184,093 | Itoh et al |

Of the foregoing patents, the following appear to be the most pertinent:

U.S. Pat. No. 5,073,869 to Bjerede is directed to suppression of spurious frequency components in a direct digital frequency synthesizer. The improved direct digital frequency synthesizer has a coarse 48/fine accumulator 40 and a non-linear digital-to-analog converter 42. The accumulator suppresses the generation of spurious frequency components in the analog waveform output of the synthesizer by randomly dithering the phase at which the coarse component accumulator 48 is incremented by the phase accumulator 40. The sample-and-hold circuit 44 mitigates spurs induced by glitches from the digital to analog converter by sampling the analog signal 56 at times when the glitches are not present.

U.S. Pat. No. 4,994,803 to Blackham is directed to a random number dither circuit for digital to analog output signal linearity. Distortion is reduced in a linear circuit by adding a random digital number to the input and subtracting the equivalent random analog number from the output. A digital number from random number generator 14 is summed with the input digital number and is converted to an analog number by DAC 18. The summed input and random number is converted to an analog signal by DAC 24 and the output of 18S is subtracted in summer 22 to provide the distortion-free output.

U.S. Pat. No. 5,162,746 to Ghoshal is directed to a circuit for attenuating phase jitter in a clock signal that includes a dithering circuit, a phase locked loop, and a digitally controlled oscillator. The dithering circuit modulates the digitally controlled oscillator to improve rejection behavior when the incoming clock frequency is substantially the same as the divided down oscillator signal.

U.S. Pat. No. 5,108,182 to Murphy is directed to a digital path length control for a ring laser gyro comprising a dither counter, a dither DAC, a control counter, a control DAC, and a piezoelectric transducer path length control driven by two DAC's. The dither modulates the operating conditions to center rather than at either extreme of the system error.

U.S. Pat. No. 5,036,294 McCaslin is directed to a phase locked loop having low frequency jitter compensation. An output clock that is in-phase with a reference clock utilizes a dither circuit to control the switching of the phase locked loop. A switch capacitor phase locked loop 10 has a dither portion 16 that translates the low frequency intrinsic jitter to a higher frequency jitter where it is more tolerated.

None of the aforementioned prior art discloses a method and apparatus for exponentially decreasing the complexity of numerically-controlled oscillators and direct digital frequency synthesis with only a small increase in system noise.

STATEMENT OF THE INVENTION

The technique of the present invention reduces the representation word length without increasing spur magnitudes by first adding a low-level random noise, or dither, signal to the amplitude and/or the phase samples, which are originally expressed in a longer word length. The resulting sum, a dithered phase or amplitude value, is truncated or rounded to the smaller, desired word length. Of course, either the amplitude or the phase or both can be dithered. In phase dithering the spurious response is determined by the type of dithering signal employed. In amplitude dithering the spurious response is determined by the original, longer word length. While the amplitude-related spurious is generally related to the phase-related spurious, the pre-dither amplitude word length is made long enough to satisfy spur power specifications. Then the exact relationship is unimportant, and since the phase dither signal is independent of the amplitude dither signal, the amplitude and phase dithering processes can be treated independently.

The applicant first describes the quantizer model. Amplitude and phase quantization effects are then reviewed, and simple new bounds on spurious performance are presented. In contrast to bounds in the prior art, the new bounds are straight-forward and require little information about the signal to be quantized. The derivations of the new bounds provide motivation for new analysis of dithered quantizer performance. An analysis of dithering with a periodic noise source is presented. The periodic noise source is considered because of its similarity to implementations involving linear feedback shift registers (LFSRs), or Pseudo-Noise (PN) generators. New analysis of phase dithering effects is presented, followed by simulation results and a design example.

OBJECTS OF THE INVENTION

It is therefore a principal object of the invention to provide a method and apparatus for implementing high performance digital synthesizers with dramatically reduced complexity and while avoiding high noise power spectral density levels.

It is another object of the invention to provide a method and apparatus for using a digital dithering approach to spur reduction and reduction in the complexity of numerically-controlled oscillators, frequency synthesizers and other periodic waveform generators.

It is still an additional object of the present invention to employ a new approach to amplitude and/or phase dithering which permits the reduction of word length while reducing spurs thereby facilitating significant reductions in the complexity of numerically-controlled oscillators, frequency synthesizers and other periodic waveform generators.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Quantizer Model

When a discrete-time input signal $x[n]$, is passed through a uniform mid-tread quantizer, the output signal, $y[n]$, can always be expressed as $y[n]=x[n]+e[n]$ where $e[n]$ is the quantization error, a deterministic function of $x[n]$. The input to the quantizer is mapped to one of the $2^b$ levels, where b is the number of bits which digitally represent the input sample. Output levels are separated by one quantizer step size, $\Delta=2^{-b}$. Throughout this description $\Delta_A$ will be used as the step size for amplitude quantization results, $\Delta_P$ will be used for phase quantization results, and $\Delta$ will be used if the result applies to both amplitude and phase quantization. Similar subscripting will be used on the quantization error.

Figure 1:
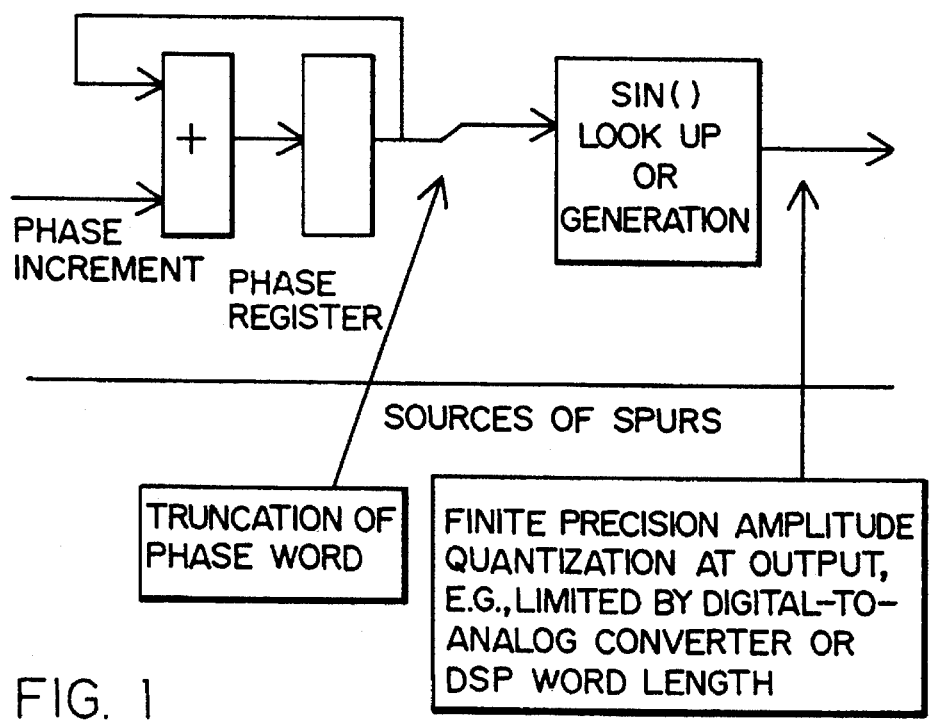
FIG. 1 is a block diagram of a conventional digital sinusoid generator.
Figure 2:
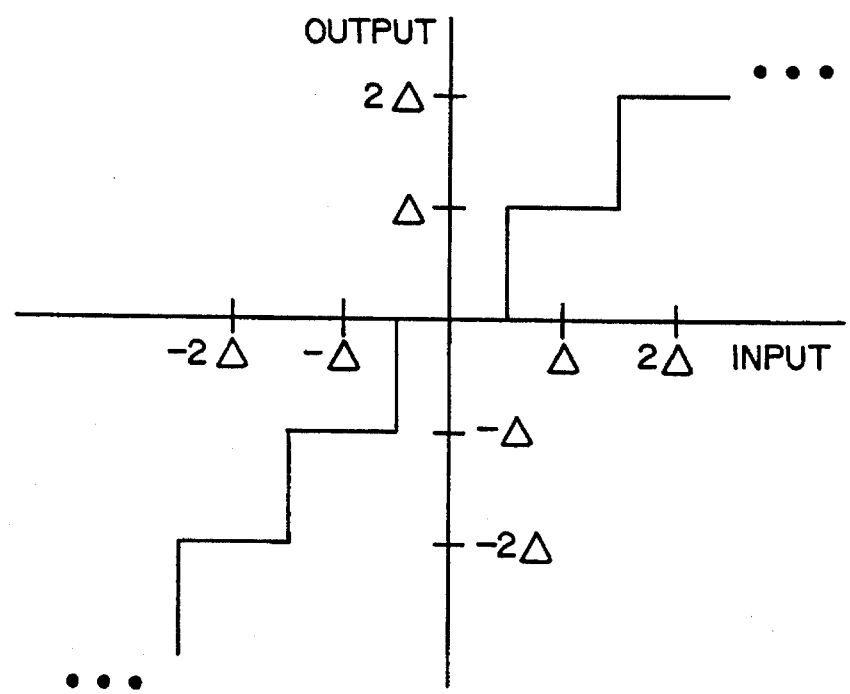
FIG. 2 is a graphical representation of the input/output relation of a midtread quantizer.

The input/output relation of a mid-tread quantizer appears in FIG. 2. If the input does not saturate the quantizer then the quantizer error is:

$$e[n] = \sum_{\substack{k=-\infty \\ k \neq 0}}^{\infty} (-1)^k \frac{\Delta}{j2\pi k} \exp\left(\frac{j2\pi k x[n]}{\Delta}\right). \tag{1}$$

If the input signal is bounded so that $|x[n]| \leq A_Q$ where $A_Q = \frac{1}{2}-\Delta$, then the quantizer does not saturate and $|e[n]| \leq \Delta/2$. Throughout this paper, quantizers are always operating in non-saturation mode.

Amplitude Quantization Effects

Let a discrete-time sinusoid with amplitude $A \leq A_Q$ and frequency $\omega_0$ be the input to a mid-tread quantizer. If the sinusoid is generated in a synchronous discrete-time system, $\omega_0$ can be expressed as $2\pi$ times the ratio of two integers. The input sequence is the periodic with a finite period. Since the error sequence, $e_A[n]$, is a deterministic function of the input sequence, it is periodic with a finite period as well. So $e_A[n]$ has a Fourier series representation as a function of time. Therefore, the spectrum of the error sequence will consist of discrete frequency components (spurs) which contaminate the spectrum of $x[n]$.

The following argument leads to an upper bound on the size of the largest frequency component in the spectrum of $e_A[n]$. Assuming the quantizer is not saturated by the input signal x[n], the maximum possible quantization error is $\Delta_A/2$, where $\Delta_A$ is the amplitude quantization step size. The total power in $e_A[n]$ is then bounded by $\Delta_A^2/4$. By Parseval's relation, the sum of the spur powers in the spectrum of $e_A[n]$ equals the power in $e_A[n]$. In order to maximize the power in a given spur the total number of spurs must be minimized. Since $e_A[n]$ is real with the exclusion of static (DC) spurs and spurs at half the sampling rate, DC offsets and half sampling rate spurs can be corrected by appropriate calibration and filtering, the maximum power in a spur occurs when there are two frequency components at $+\omega_3$ and $-\omega_3$, with equal power. With two frequency components, $e_A[n]$ is sinusoidal. Therefore since the power in $e_A[n]$ is $\leq \Delta_A^2/4$, the power in a single spur is $\leq \Delta_A^2/8$.

Since x[n] is real, its spectrum consists of two frequency components, at $+\omega_0$ and $-\omega_0$, each having power $A^2/4$. Using the above bound on spur power, the spur to signal ratio (SpSR) is $\leq \Delta_A^2/(2A^2)$. If $A=A_Q \approx 1/2$ provided b is not small, then in decibels with respect to the carrier (dBc), SpSR$\leq$3–6 b dBc, where $\Delta_A=2^{-b}$, and b is the word length in bits. In summary, the upper bound above on power in a spur caused by amplitude quantization exhibits –6 dBc per bit behavior.

Phase Quantization Effects

Now let a phase waveform, $\phi[n]$, be the input to the mid-tread quantizer. The phase waveform, $\phi[n]=(fn+\phi/2\pi)$ is a sampled sawtooth with amplitude ranging from 0 to 1. The fractional operator, (x), is defined so that (x)=x mod 1, e.g., (1.3)=0.3. Since $\phi[n]$ is generated by a synchronous, finite-word-length, discrete-time system, it has a finite period. The signal output from the quantizer can be expressed as $\phi[n]+e_p[n]$, where $e_p[n]$ represents the error introduced by quantization. Again, since $\phi[n]$ is periodic, $e_p[n]$ is periodic with a period less than or equal to the period of $\phi[n]$. After multiplication by $2\pi$ and passage through the ideal function generator, the output signal is $y[n]=A\cos(2\pi\phi[n]+2\pi e_p[n])$. If the quantizer has many levels, i.e., >16, then $e_p[n]<<1$. The approximation $y[n]\approx A\cos(2\pi\phi[n])-2\pi A e_p[n]\sin(2\pi\phi[n])$ is obtained using small angle approximation for cosine.

Since $e_p[n]$ and $\phi[n]$ are periodic, the total error $2A\pi e_p[n]\sin(2\pi\phi[n])$ is periodic. The total error is a real signal, so using the above amplitude quantization argument, the maximum spur power is bounded by $(\max\{2\pi A e_p[n]\sin(2\pi\phi[n])\}^2)/2$. This equals $\pi^2 A^2 \Delta_p^2/2$, where $\Delta_p=2^{-b}$ and b bits are used to represent phase samples. By the above approximation for y[n] and the bound on the spur power SpSr$\leq 2\pi^2 \Delta_p^2$=13–6 b dBc, independent of the signal amplitude, A. In practice this simple bound can be improved by about 9 dB, but it demonstrates the maximum spur power behavior of –6 dBc per phase bit.

Amplitude Dithering

It will now be shown that rounding the sum of an already quantized sinusoid and using an appropriate dither signal cause spurious magnitudes which depend on the original (longer) word length, not the output (shorter) word length. This phenomenon occurs at the expense of increased system noise from the addition of the dithering signal. An important finite word-length dithering system is subsequently shown to be equivalent to the continuous-amplitude uniformly-dithered system.

Figure 3:
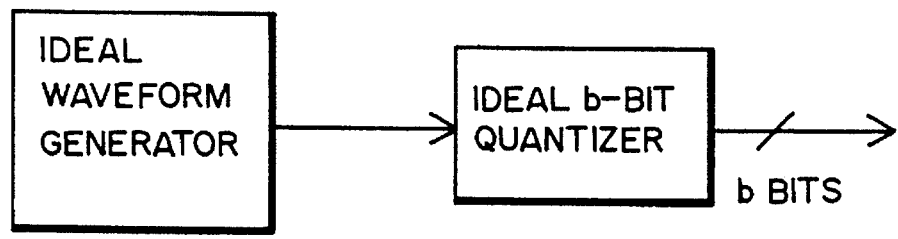
FIG. 3 is a conceptual block diagram of a waveform generator.
Figure 4:
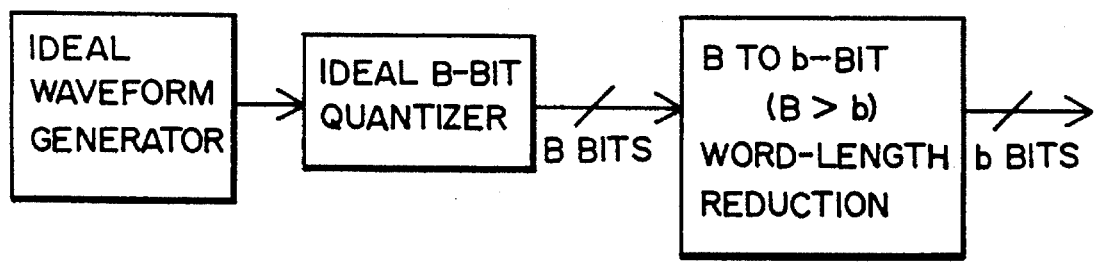
FIG. 4 is a block diagram of a two-step waveform generator.

Consider the conceptual block diagram for a waveform generator shown in FIG. 3. The b-bit quantizer can be split into two parts: a high resolution B-bit quantizer (B>b) followed by a unit for truncation or round to b bits. The resulting waveform generation system is shown in FIG. 4. Thus, the generation process consists of two separate steps: production of a high-resolution waveform and reduction of the word length. The number of bits used to represent the high-resolution samples should be sufficient to guarantee the desired spectral purity. Then, the word length should be reduced without creating excess signal-dependent quantization error.

Figure 5:
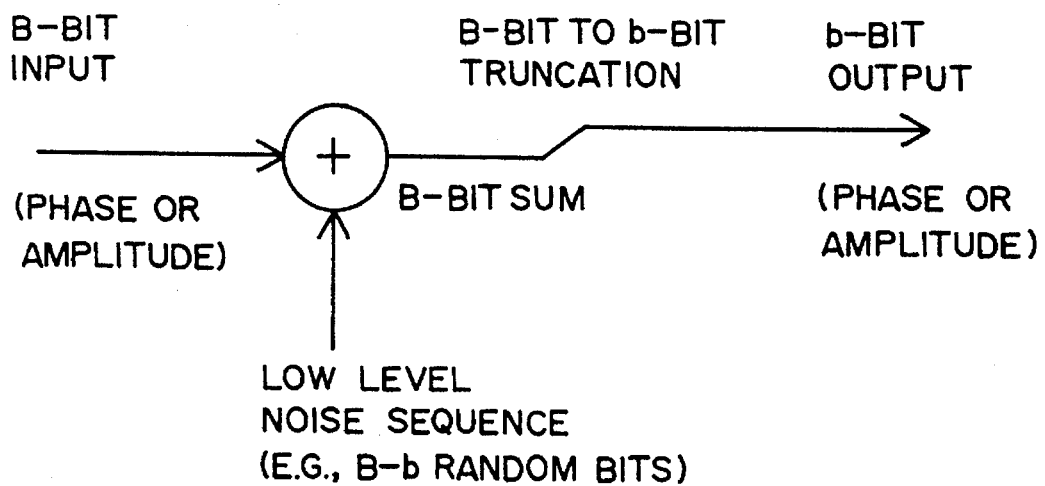
FIG. 5 is a block diagram of a uniform dithered quantizer.

The input in FIG. 5 x[n], is a B-bit representation of A $\sin(2\pi\phi[n])$, where $\phi[n]$ is the phase value at time n. The input can be expressed as $x[n]=A\sin(2\pi\phi[n])+e_{AO}[n]$, where $e_{AO}[n]$ is the quantization error due to some previous quantization of A $\sin(2\pi\phi[n])$. For example, x [n] could be the output from a sine look-up table with output word length B bits. The dither signal, $z_u[n]$, is white noise uniformly distributed in $[-\Delta_A/2, \Delta_A/2)$, where $\Delta_A=2^{-b}$.

After $z_u[n]$ and x[n] are added, the output is rounded to retain only the b most significant bits. The rounding can be modeled as a uniform quantizer with step size $\Delta_A$. The amplitude A is chosen to avoid saturating this quantizer when the dither signal is added, i.e., $A+\Delta_A/2 \leq A_Q$.

The output from the quantizer can be expressed as $y[n]=x[n]+z_u[n]+e_A[n]$. The characteristic function of the dither signal, $z_u[n]$, is:

$$F_z(\alpha) = E\{\exp(j\alpha z[n])\} = \text{sinc}\left(\frac{\alpha \Delta_A}{2\pi}\right), \quad (2)$$

where sinc $(x)=\sin(\pi x)/\pi x$. Since the characteristic function of $z_u[n]$ has zeros at integer multiples of $2\pi/\Delta_A$, $e_A[n]$ will be white and uniformly distributed over $[-\Delta_A/2, \Delta_A/2)$. Therefore the quantization error $e_A[n]$ is a white, wide-sense stationary process that does not contribute spurious harmonics to the output spectrum of y[n].

The only spurious components in y[n] are due to $e_{AO}[n]$, which contains the spurious components originally in x[n]. It remains to comment on the noise, i.e., the power not isolated in discrete spurious frequency components. If the sequences $e_A[n]$ and $z_u[n]$ are uncorrelated, adding the variances of the quantization error, $\Delta_A^2/12$, and the dither process, $\Delta_A^2/12$ yields a white noise power of $\Delta_A^2/6$. This approximation is twice the variance of a quantization system with no dithering signal. Note that $e_{AO}[n]$ also contributes a white noise term, and that, in general, $e_A[n]$ and $z_u[n]$ are not uncorrelated. However, these two effects are dominated by the $\Delta_A^2/6$ behavior of the white noise power. In summary, y[n], which is quantized to b bits, exhibits spurious performance as if it was quantized to B bits (B>b), at the expense of doubling the white noise power.

Because the input x[n] is expressed as a B-bit value, an important equivalent system to continuous-amplitude, uniformly-dithered word-length reduction can be constructed by replacing the uniformly distributed dither signal, $z_u[n]$, by a finite word-length of B–b bits, and is said to be discretely and evenly distributed over the quantized values in the region $[-\Delta_A/2, \Delta_A/2)$. Heuristically, z[n] randomizes the portion of the finite word-length input, x [n], that is about to be thrown away by the rounded truncation. This process is equivalent to continuous uniform dithering, since if x[n] is padded out to an infinite number of bits by placing zeros beyond the least significant bit (LSb), then only the B–b most significant bits of $z_u[n]$ will have an effect on the resulting sum $x[n]+z_u[n]$. All of the bits below the most significant B–b are added to zero, and cannot beget a carry. The output, y[n], is identical in both systems. Therefore $z_u[n]$, continuously, uniformly distributed over $[-\Delta_A/2, \Delta_A/2)$ can be replaced by z[n], and yield the same spurious response for y[n].

It appears that the finite word-length dither signal, z[n], could be generated by a linear feedback shift register (LFSR), or PN generator. This will be strictly true if and only if the PN generator has an infinite period, since at this time, the dither signal is required to be white. However, it is not surprising that the ideal behavior is approached as the period of the PN generator gets longer. With a sufficiently long period, the case where spur magnitudes are limited by the original word length can be achieved. A simple model for a system implementation using a periodic random sequence which can be approximated by a PN generator will now be described.

Effect of Periodic Dither

The use of a periodic dither signal with a long period, L, for both amplitude and phase dithering is now analyzed. Since the dither signal is periodic, the discrete frequency components in its spectrum will contaminate the desired signal. It is shown that the period can be chosen to satisfy worst case spurious specifications. The case where the dither signal is generated using one uniform variate (M=1) is given. When the dither signal is the sum of M independent uniform variates (M>1), the analysis is the same because the resulting signal is an i.i.d. sequence of random variables.

Instead of using the white dither process, $z_u[n]$, described in the previous section, consider a substitute, $z_L[n]$. The dither process, $z_L[n]$ is periodic with period L. Any two samples, $z_L[n]$ and $z_L[n+m]$, where $m \neq 0$ rood L, are independent. Samples of $z_L[n]$ are uniformly distributed between $[-\Delta/2, \Delta/2)$, and the quantization step size is $\Delta$.

When $z_L[n]$ is used as the dither signal, let the quantizer error be called $e_L[n]$. The autocorrelation of $z_L[n]$ when the lag m, is an integer multiple of L is equal to $R_{z_L z_L}[0]=\Delta^2/12$. In the PN generator approximation to this noise source, $L=2^d-1$ where d is the length of the shift register in bits. At other lag values, the samples of $z_L[n]$ are independent, and since they have zero mean, the autocorrelation is zero. Therefore:

$$R_{z_L z_L}[m] = \frac{\Delta^2}{12} \delta[m \bmod L] = \sum_{l=0}^{L-1} \frac{\Delta^2}{12L} \exp\left( \frac{j2\pi ml}{L} \right)$$

Therefore, the spectrum of $z_L[n]$ consists of L discrete frequency components with power $\Delta^2/12L$.

In the autocorrelation expression for $e_L[n]$, the expectation is taken over the random variables $z_L[n]$ and $z_L[n+m]$:

$$R_{e_L e_L}[n, n+m] = \qquad (3)$$

$$\sum_{\substack{k=-\infty \\ k \neq 0}}^{\infty} \sum_{\substack{l=-\infty \\ l \neq 0}}^{\infty} \alpha_k[n]\alpha_l^*[n+m] E\left\{ \exp\left( \frac{j2\pi}{\Delta}(kz_L[n] - lz_L[n+m]) \right) \right\}$$

where:

$$\alpha_k[n] = \frac{\Delta(-1)^k}{j2\pi k} \exp\left( \frac{j2\pi k s[n]}{\Delta} \right).$$

The desired signal to which the dither signal $z_L[n]$ is added is $s[n]$. Using the notation from earlier sections, in phase quantization, $s[n]=\phi[n]$ and in amplitude quantization $s[n]=x[n]$. When the lag is not an integer multiple of L, $$E\left\{ \exp\left( \frac{j2\pi}{\Delta}(kz_L[n] - lz_L[n+m]) \right) \right\} =$$

$$E\left\{ \exp\left( \frac{j2\pi k z_L[n]}{\Delta} \right) \right\} E\left\{ \exp\left( \frac{-j2\pi l z_L[n+m]}{\Delta} \right) \right\} =$$

$$F_z\left( \frac{2\pi k}{\Delta} \right) F_z\left( \frac{-2\pi l}{\Delta} \right) = \delta[k]\delta[l].$$

This last fact is true because the characteristic function of $z_L[n]$ has zeros at all non-zero integer multiples of $2\pi/\Delta$ (Equation 2). But since the sums over k and l never assume the value 0, the autocorrelation function is zero when the lag is not 0 mod L. When the lag is 0 mod L:

$$E\left\{ \exp\left( \frac{j2\pi}{\Delta}(kz_L[n] - lz_L[n+m]) \right) \right\} =$$

$$E\left\{ \exp\left( \frac{j2\pi(k-l) z_L[n]}{\Delta} \right) \right\} = \delta[k-l].$$

This results in:

$$R_{e_L e_L}[n, n+m] =$$

$$\frac{\Delta^2}{2\pi^2} \sum_{k=1}^{\infty} \frac{1}{k^2} \cos\left( \frac{2\pi k}{\Delta}(s[n] - s[n+m]) \right)$$

Setting m=0 in (4) yields the power in $e_L[n]$:

$$R_{e_L e_L}[n,n] = \frac{\Delta^2}{2\pi^2} \sum_{k=1}^{\infty} \frac{1}{k^2} = \frac{\Delta^2}{12}.$$

From Equation 4, $e_L[n]$ is a cyclo-stationary process because $s[n]$ has a finite period, N. Using the results of Ljung, spectral information is obtained when Equation 4 is averaged over time. Note that when the lag, m, is not only an integer multiple of L, the period of the either, but also an integer multiple of N, the autocorrelation function equals $\Delta^2/12$, independent of n. The smallest nonzero lag that satisfies these two conditions is the least common multiple of L and N, denoted by qL where q is an integer. Therefore, the period of the time-averaged author relation function, $R_{e_L}[m]=\mathrm{Avg}(R_{e_L e_L}[n, n+m])$, is at least L aria at most qL. Let the period equal cL, where c is an integer, $1 \leq c \leq q$. The function $R_{e_L}[m]$ can be expressed as a sum of cL weighted complex exponentials:

$$\bar{R}_{e_L}[m] = \sum_{l=0}^{cL-1} p_l \exp\left( \frac{j2\pi ml}{cL} \right), m = \ldots, -1, 0, 1, 2, \ldots$$

where $$p_l = \frac{1}{cL} \sum_{m=0}^{cL-1} \bar{R}_{e_L}[m]\exp\left( \frac{j2\pi ml}{cL} \right) =$$

$$\frac{1}{cL} \sum_{n=0}^{c} \bar{R}_{e_L}[nL]\exp\left( \frac{j2\pi nl}{c} \right).$$

The last equality is true since the autocorrelation function in Equation 3 and its time-average, $R_{e_L}[m]$ are zero for lags not equal to integer multiples of L. The weights, $P_l$, are the power magnitudes of the spurs. Since $R_{eL}[m]$ is less than or equal to $\Delta^2/12$, the spur power can be bounded:

$$p_1 \leq \frac{\Delta^2}{12cL} \leq \frac{\Delta^2}{12L}.$$

Equality is achieved when the period of the time-averaged autocorrelation function is exactly L, the period of the dither.

As $L \to \infty$, the spacing between spurs goes to zero in the spectra of both $e_L[n]$ and $z_L[n]$. The power in an individual spur goes to zero, but the density (power per unit of frequency) tends to a constant. Thus, ideal white noise behavior is approached. While $z_L[n]$ and $e_L[n]$ are correlated in general, the worst case spur power scenario coherently adds the power spectra from both processes. For this reason, L should be chosen to satisfy $2\Delta^2/12L<P_{max}$, where $P_{max}$ is the maximum acceptable spur power. When constructing a dither signal as the sum of $M \geq 1$ independent, uniform variates the noise autocorrelation becomes $R_{z_L z_L}[m]=M\Delta^2/12\delta[m \bmod L]$. The analysis follows closely to that for M=1, and L should be chosen to satisfy $(M+1)\Delta^2/12L<P_{max}$.

Since the desired signal has finite word length, it is equivalent to round or truncate the dither signal to an appropriate finite word length. The truncated periodic noise source is an approximation to the behavior of an implementation using a PN generator which produces a periodic sequence of discretely and evenly distributed random numbers.

Phase Dithering

Phase dithering is now analyzed using a continuous, zero-mean, wide-sense stationary sequence. As described above in reference to amplitude dithering, an evenly distributed discrete random sequence is equivalent to continuous uniform dithering when the initial phase word is quantized to a finite number of bits.

Let the digital sinusoid to be generated be:

$$\tau[n]=\cos(2\pi\phi[n]) \quad (5)$$

and let the phase process be given by:

$$\phi[n]=\hat{\phi}[n]+\epsilon[n]=(fn+\Phi/(2\pi))+\epsilon[n] \quad (6)$$

so that the desired phase is $\hat{\phi}[n]$, measured in cycles with a frequency of f cycles per sample, and a static offset of $\Phi$ radians. The total quantization noise is $\epsilon[n]=e_p[n]+z[n]$, the sum of the dither signal and the quantizer error. Using small angle approximations:

$$\tau[n]=\cos(2\pi fn+\Phi)-2\pi\epsilon[n]\sin(2\pi fn+\Phi)+O((\max(\epsilon[n]))^2).$$

The total quantization noise will be examined by considering the first two terms above, and then the second-order, $O([\max(\epsilon[n])]^2)$, effect.

A) FIRST ORDER ANALYSIS

Since the quantization error after dithering is independent of the input signal $\epsilon[n]$ is uncorrelated with the desired sinusoids. Without loss of generality, and for ease of notation, let us shift the uniformly distributed dither random variate range to $(0,\Delta_p)$. The total phase quantization noise $\epsilon[n]$ will be $\epsilon[n]=-\Delta_p p[n]$ with probability $(1-p[n])$, and $\epsilon[n]=(1-p[n])\Delta_p$ with probability $p[n]$. The value $p[n]$ is the distance from the initial high-precision phase value, $\phi[n]$, to the nearest greater quantized value normalized by the phase quantization step size $\Delta_p$. The value of the probability sequence $p[n]$ varies periodically, since $p[n]=\phi[n] \bmod \Delta_p$, and $\phi[n]$ is periodic. At all sample times n, $E\{\epsilon[n]\}=-\Delta_p p[n](1-p[n])+\Delta_p(1-p[n])p[n]=0$.

Information about the spurs and noise in the power spectrum of x[n] is obtained from the autocorrelation function. The autocorrelation of x[n] is:

$$E\{x[n]x[n+m]\} = \cos(2\pi fn + \Phi)\cos(2\pi f(n + m) + \Phi) +$$
$$4\pi^2\sin(2\pi fn + \Phi)\sin(2\pi f(n + m) +$$
$$\Phi)E\{\epsilon[n]\epsilon[n+m]\} + O(\Delta_p^4).$$

In the absence of error ($\epsilon[n]$ identically zero), the autocorrelation of the process x[n] is $$E\{\tau[n]\tau[n+m]\}=\cos(2\pi fn+\Phi)\cos(2\pi f[n+m]+\Phi)$$

which is equal to the first term in the autocorrelation when the error sequence is non-zero. The second term in the autocorrelation is due entirely to the error.

When $\epsilon[n]$ is not identically zero spectral information is obtained by averaging over time (9), resulting in:

$$\bar{R}_{\tau\tau}[m] \approx (\tfrac{1}{2})[1+4\pi^2\bar{R}_{\epsilon\epsilon}[m]]\cos(2\pi fm)$$

where $\bar{R}_{\epsilon\epsilon}[m]=\text{Avg}_n(E\{\epsilon[n]\epsilon[n+m]\})$, time-averaged autocorrelation of the total quantization noise.

The power spectrum of x[n], the Fourier transform of the autocorrelation, is the power spectrum of desired sinusoid of frequency f with the total quantization noise amplitude modulated on the desired sinusoid. Note that since $\bar{R}_{\epsilon\epsilon}[m]=O(\Delta_p^2)$, and $\Delta_p<<1$, the modulation index is small.

To a first-order the AM signal produced by phase dithering is clear of spurious harmonics down to the level due to periodicities in the dither sequence. The next section will examine spur performance in more detail, but first it is important to consider the noise power spectral density added in the phase dithering process. This result is achieved by deriving the signal-to-noise ratio (SNR).

Recall that for any fixed time n, the probability distribution of $\epsilon[n]$, a function of $p[n]$, is determined by the input signal, but the outcome of $\epsilon[n]$ is determined entirely by the outcome of the dither signal z[n]. When z[n] and z[n+m] are independent random variables for non-zero lag m, $\epsilon[n]$ and $\epsilon[n+m]$ are also independent for $m\neq 0$, and hence $\epsilon[n]$ is spectrally white. In this case, the autocorrelation becomes:

$$\bar{R}_{\tau\tau}[m]\approx\tfrac{1}{2}\cos(2\pi fm)+2\pi^2\delta[m]\text{Var}(\epsilon)$$

where $\text{Var}(\epsilon)$ is the time-averaged variance of the total quantization noise, and $\delta[m]$ is the Kronecker delta function ($\delta[0]=1$, $\delta[m]=0$, $m\neq 0$). The resulting SNR is:

$$\text{SNR}\approx(\tfrac{1}{2})/(2\pi^2\text{Var}(\epsilon))\approx 1/(4\pi^2\text{Var}(\epsilon)).$$

When the dither signal is constructed from one uniform $[-\Delta_p/2, \Delta_p/2)$ random variate, the error $\epsilon[n]$ is bounded between $-\Delta_p$ to $\Delta_p$ with $\Delta_p=2^{-b}$, and b is the number of bits in the phase representation after the word-length is reduced. The number of bits, b, must be large enough to satisfy the small angle assumption earlier, typically $b \geq 4$. The time-averaged variance of $\epsilon[n]$ is less than or equal to $2^{-2b}/4$, and the SNR is:

$$\text{SNR} \geq 2^{2b} * 4/(4\pi^2) = (20b)\log_{10}(2) - 20\log_{10}(\pi)\text{dB} \geq$$

$$6.02b - 9.94\text{dB}.$$

Since the sinusoid generated is a real signal, the signal power in the SNR will be divided between positive and negative frequency components. If the sinusoid is the result of a discrete-time random process with sampling frequency $f_S$, then the resulting noise power spectral density (NPSD) will be given by:

$$NPSD \approx -[SNR/2 + 10\log_{10}(f_s/2)]\text{dBc/Hz} \leq \quad (7)$$

$$6.93 - 10\log_{10}(f_s/2) - 6.02b \text{ dBc/Hz}.$$

As an example, TABLE I gives noise power spectral densities as a function of the number of bits per cycle, b, at a 160 MHz sampling rate, calculated according to the above formula.

TABLE I

| b (bits/cycle) | Noise Power Spectral Density |
|---|---|
| 5 | −102.20 dBc/Hz |
| 6 | −108.22 dBc/Hz |
| 7 | −114.24 dBc/Hz |
| 8 | −120.26 dBc/Hz |
| 9 | −126.28 dBc/Hz |
| 10 | −132.30 dBc/Hz |
| 11 | −138.32 dBc/Hz |
| 12 | −144.35 dBc/Hz |

B) SECOND ORDER ANALYSIS: RESIDUAL SPURS

For a worst-case analysis of second order effects, expand the initial cosine from Equation 5 and 6 by the sum of angles formula:

$$\tau[n]=\cos(2\pi\epsilon[n])\cos(2\pi fn+\Phi)-\sin(2\pi\epsilon[n])\sin(2\pi fn+\Phi).$$

Information about the spurs in the power spectrum of x[n] is obtained from the autocorrelation function at nonzero lags. When the dither sequence, z[n], is sequence of i.i.d. variates, the autocorrelation function for x[n], with lag m not equal to zero, is:

$$R_{\tau\tau}[n,n+m]=E\{\tau[n]\tau[n+m]\}=E\{\tau[n]\}E\{\tau[n+m]\}.$$

The expected value of x[n] is a deterministic function of time. From the above expression, it follows that spectral information about the random process x[n], with the exception of noise floor information, is contained in $E\{x[n]\}$. Call the sequenced of $E\{x[n]\}$ the "expected waveform":

$$E\{x[m]\} = E\{\cos(2\pi\epsilon[m])\}\cos(2\pi fm + \Phi) -$$

$$E\{\sin(2\pi\epsilon[m])\}\sin(2\pi fm + \Phi) =$$

$$(1 - 2\pi^2 E\{\epsilon^2[m]\})\cos(2\pi fm + \Phi) -$$

$$2\pi E\{\epsilon[m]\}\sin(2\pi fm + \Phi) + O(\Delta_p^3).$$

Since $\epsilon$ is zero mean at all sample times this reduces to:

$$E\{\tau[m]\}=(1-2\pi^2 E\{\epsilon^2[m]\})\cos(2\pi fm+\Phi)+O(\Delta_p^3).$$

It remains to consider $E\{\epsilon^2[m]\}$, which we evaluate by using the probability sequence p[m] from the previous section:

$$E\{\epsilon^2[m]\}=\Delta_p^2 p^2[m](1-p[m])+\Delta_p^2(1-p[m])^2 p[m]=\Delta_p^2(p[m]-p^2[m]).$$

Since p[m] is bounded between 0 and 1, the function $u[m]=p[m]-p^2[m]$ is bounded between 0 and ¼, with its maximum value of ¼ at p[m]=½.

Since u[m] is bounded between 0 and ¼, it must have some non-zero DC (average) component. Any remaining components can be periodic in the worst case. Since all non-linear operations have been performed, conservation of power (energy) arguments can be used to determine the total non-DC error power. The total power in the DC component of u[m] is equal to the square of the average value of u[m]. Similarly, the total power in u[m] is equal to the average value of $u^2[m]$. Thus, the power remaining for time-varying components of u[m] is:

$$\text{Avg}(u^2[m])-(\text{Avg}(u[m]))^2=\text{Avg}((u[m]-\text{Avg}(u[m]))^2).$$

This value is maximized by maximizing the dispersion of the samples about the mean. When the sample values are bounded, this maximization is achieved by placing half of the samples at each bound, so that the mean is equidistant from each bound. Since $0 \leq u[m] \leq ¼$, this sets the mean of u[m] at ⅛, and the maximum power present in harmonic components is:

$$(.5*(0)^2+0.5*(¼)^2)-(⅛)^2=1/64.$$

Recall that at this worst case, half of the values of $E\{\epsilon^2[m]\}$ are zero and half are +¼. Since $\epsilon^2[m]$ is non-negative, $E\{\epsilon^2[m]\}+0$ implies that $\epsilon[m]=0$. Note that the difference between $\epsilon[m]$ and $\epsilon[m+1]$ is the phase increment modulo the quantization step size. If, for any m and m+1, $\epsilon[m]=\epsilon[m+1]=0$, the phase increment can be exactly expressed in the new quantization step. By induction, $\epsilon[m]$ will be zero for all m if any two adjacent values $E\{\epsilon^2[m]\}$ and $E\{\epsilon^2[m+1]\}$ are both zero. The only possible sequence $E\{\epsilon^2[m]\}$ achieving the worst case is therefore 0, ¼, 0, ¼, 0, ¼... This sequence has a single sinusoidal component at the Nyquist frequency, half the sampling rate.

In the worst case the model to consider is $u[m]=⅛-(⅛)\cos(\pi m)$ since $\cos((2\pi f+\pi)m+\Phi)=\cos((2\pi f-\pi)m+\Phi)$. The expected waveform is:

$$E\{x[m]\} = ((1 - \pi^2\Delta_p^2/4) +$$

$$(\pi^2\Delta_p^2/4)\cos(\pi m))\cos(2\pi fm + \Phi) + O(\Delta_p^3) =$$

$$(1 - \pi^2\Delta_p^2/4)\cos(2\pi fm + \Phi) +$$

$$(\pi^2\Delta_p^2/4)\cos((2\pi f + \pi)m + \Phi) + O(\Delta_p^3),$$

clearly showing the desired signal and spur components. Thus, dropping the $O(\Delta_p^3)$ term, a −18 dB per bit power behavior, the worst-case spur level relative to the desired signal after truncating to b bits is (SpSR):

$$SpSR \approx \frac{\pi^4\Delta_p^4/16}{(1-\pi^2\Delta_p^2/4)^2} \approx \frac{\pi^4\Delta_p^4}{16} = 7.84 - 12.04b \text{ dBc}.$$

This worst case is achieved for a large class of frequencies. Let the phase of the desired signal $\Phi=0$, and let the desired frequency be R cycles in $2^{b+1}$ samples, where R is an odd integer. The sequence $\epsilon^2[m]$ will be deterministic: 0, $\Delta_p^2/4$, 0, $\Delta_p^2/4$..., exactly the worst case analyzed above. The frequency of the spur is the reflection of the desired signal across ¼ the sampling rate, and, as a result, it can be as close as $½^b$ th of the sampling rate from the desired sinusoid.

In summary, if b bits of phase are output to a look-up table, and B bits of phase (B>b) are used prior to truncation, then the addition of an appropriate dithering signal using (B−b) bits will allow the word length reduction without introducing spurs governed by the usual −6 b dBc behavior. If a single random variate is added as a dither signal (first-order dithering), the spur suppression is accelerated to 12 dB per bit of phase representation. Since the table size is only effected linearly by the number of bits in a table entry, rather than exponentially as it is by the number of phase bits, the amplitude word length is of secondary importance to the phase word length, especially in all-digital systems. For example, −90 dBc spur performance would nominally require b=16 bits of phase and a 65,536 entry table. With first-order dithering, this level of performance requires only b≧8.1 bits of phase per cycle in the look-up table addressing. Worst-case spur performance of −100.5 dBc is achieved with 9 bits, a 512 entry table at most, and, at a 160 MHz sampling rate, TABLE I shows that with these realistic system parameters, the noise power spectral density is at a low −126 dBc/Hz.

ACCELERATED SPUR SUPPRESSION

Further analysis based on an extension of results by Gray (R. M. Gray and T. G. Stockham, Jr., "Dithered Quantizers," presented at 1991 IEEE International Symposium on Information Theory, Budapest, Hungary, June 1991) indicates that the phase spur suppression rate can be increased in steps of 6 dBc per bit by adding multiple uniform random deviates to the phase value prior to truncation. The addition of M uniform random deviates produces a dither signal with Mth-order zeroes in its characteristic function, thus making the Mth moment of the quantization error independent of the input sequence.

Figure 6:
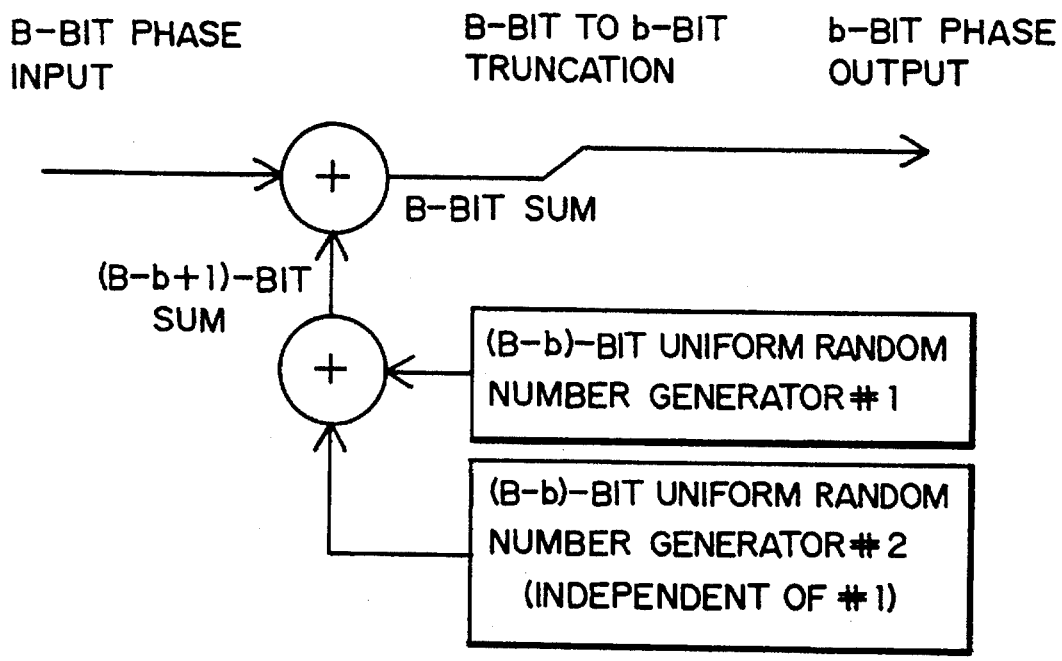
FIG. 6 is a block diagram of a system for 18 dBc per phase bit spur reduction.

An example of this technique providing 18 dBc per phase bit spur performance is shown in FIG. 6. This technique involves adding two B−b bit uniform deviates to produce a B−b+1 bit dither signal, which achieves the accelerated spur reduction due to second-order zeroes in the dither characteristic function. Simulation results for when two uniform variates are added to the phase are presented in the next section. A straightforward extension of this technique to polynomial series allows spur-reduced synthesis of periodic digital signals with arbitrary waveforms.

SIMULATION RESULTS

Figure 7:
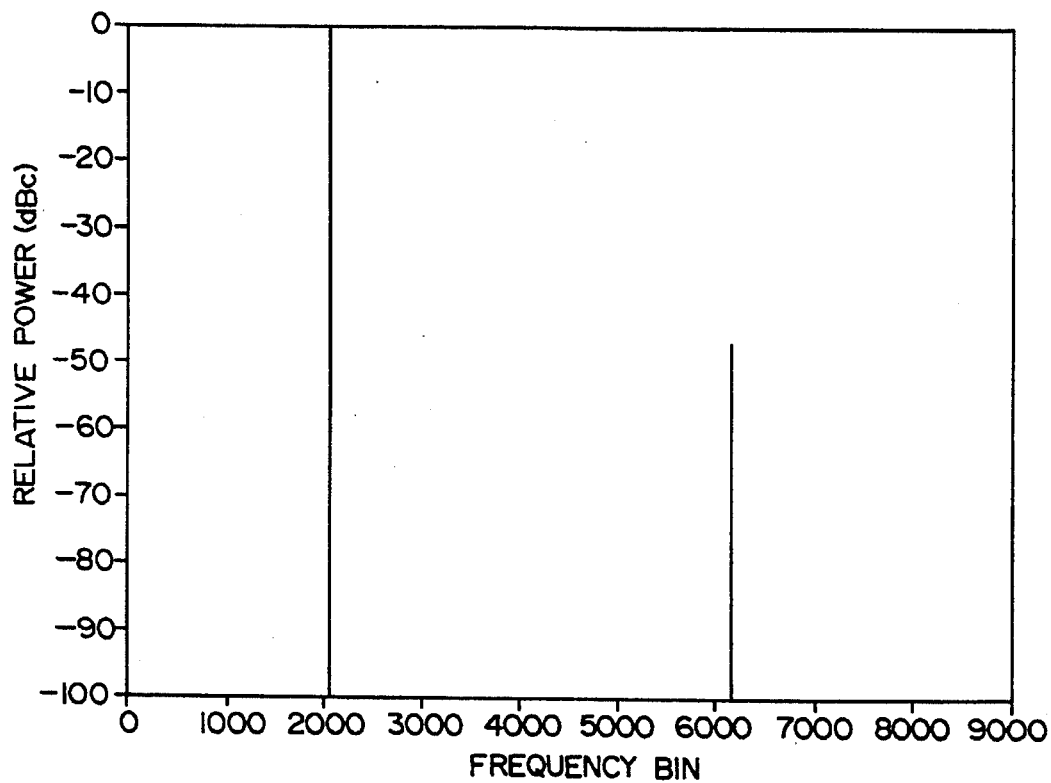
FIG. 7 is a graphical representation of a power spectrum of an 8 sample/cycle sine wave without dithering.

Simulations were performed to validate the results of this analysis. These results were obtained using 8192-point unwindowed FFTs, and the synthesized frequencies were chosen to represent worst-case amplitude and phase spur performance. FIG. 7 shows the power spectrum of a sine wave of one-eighth the sampling frequency truncated to 8 bits of amplitude without dithering.

Figure 8:
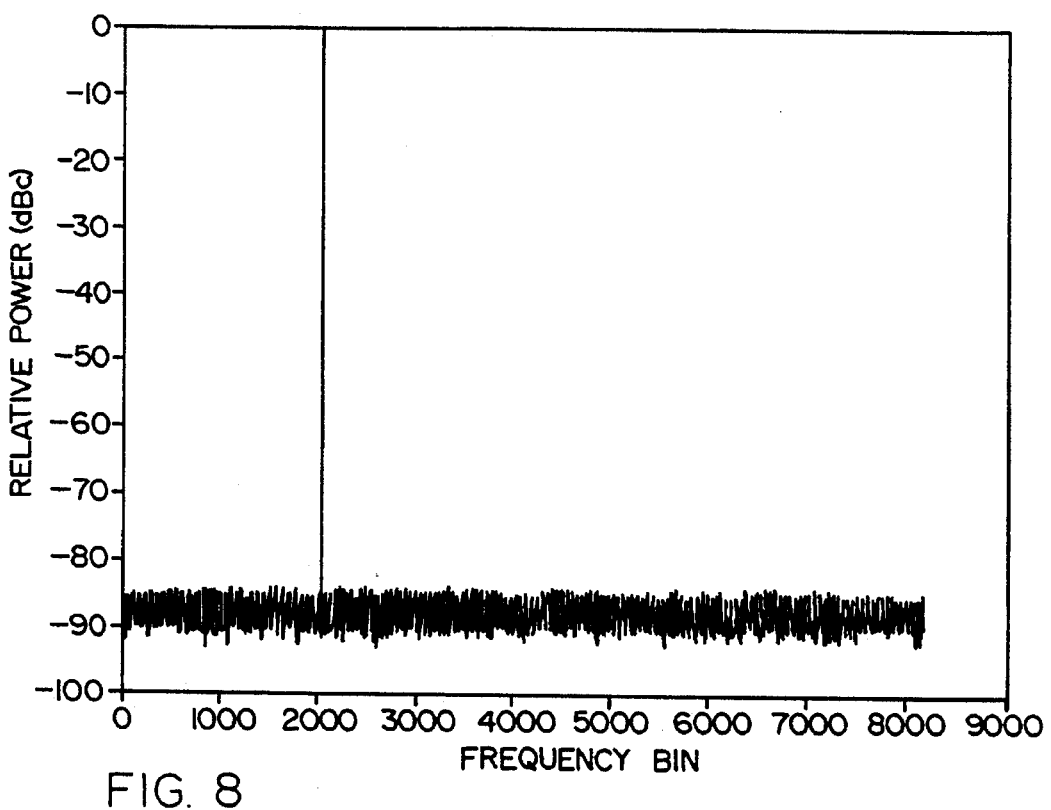
FIG. 8 is a graphical representation of a power spectrum of an 8 sample/cycle sine with amplitude dithering.

FIG. 8 shows the same spectrum with a sixteen-bit sinusoid amplitude dithered with one uniform variate prior to truncation to 8 bits. Note that the spurs have been eliminated to the levels consistent with those imposed by the initial sixteen bit quantization.

Figure 9:
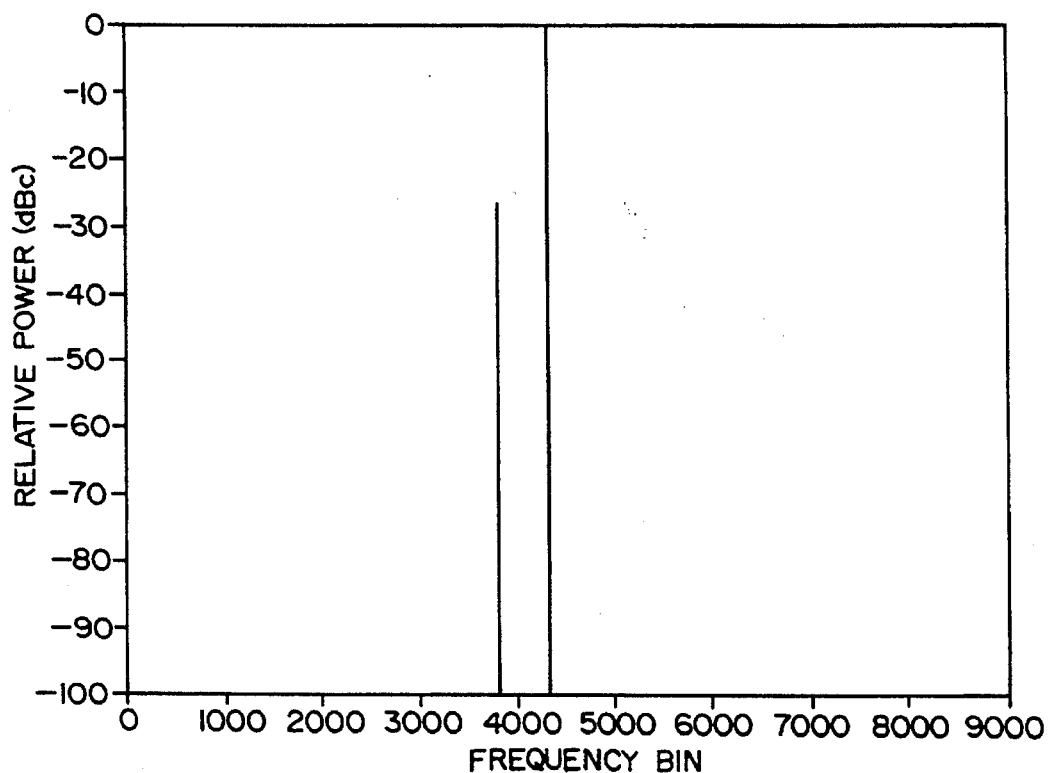
FIG. 9 is a graphical representation of a power spectrum of a 5-bit phase-truncated sine wave without phase dithering.
Figure 10:
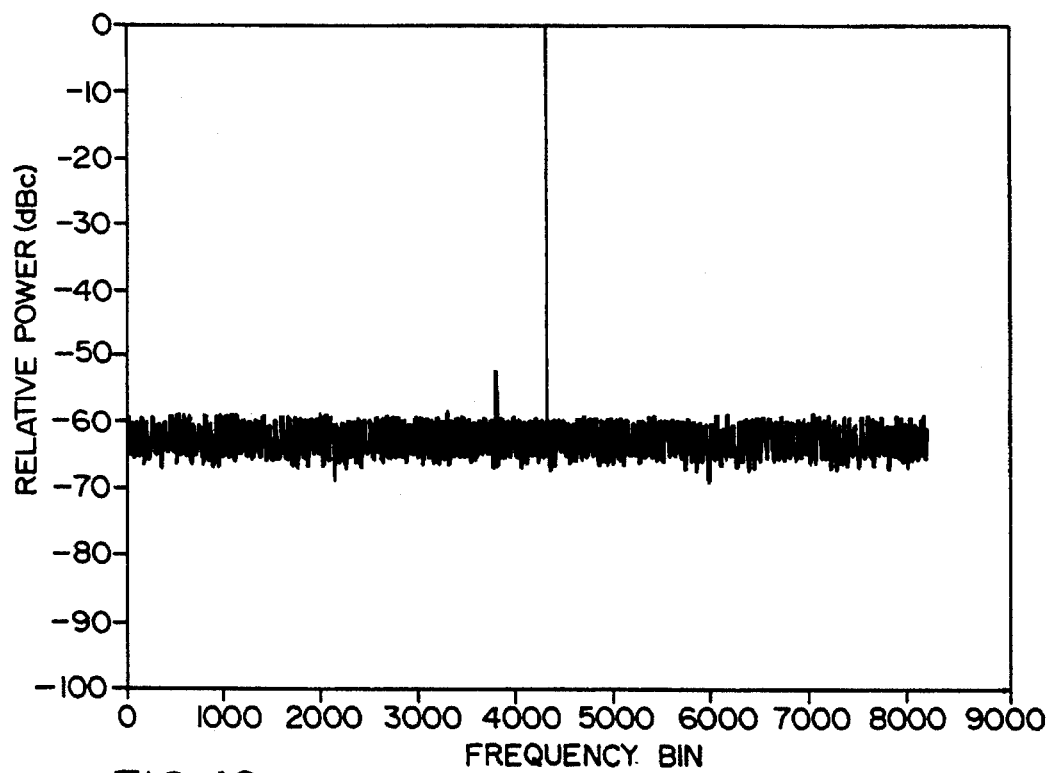
FIG. 10 is a graphical representation of a power spectrum of a 5-bit phase-truncated sine wave with first-order phase dithering.

FIG. 9 shows the spectrum of a 5-bit phase-truncated sinusoid with high-precision amplitude values. A worst-case example of first-order phase dithering is shown in FIG. 10. The measured noise power spectral density in FIG. 10 is −62.3 dBc per FFT bin, giving a noise density of −23.2−19 $\log(f_s/2)$ dBc, in agreement with the upper bound derived in Equation 7. The spur level is −52.3 dBc in the first-order dithered FIG. 10.

Figure 11:
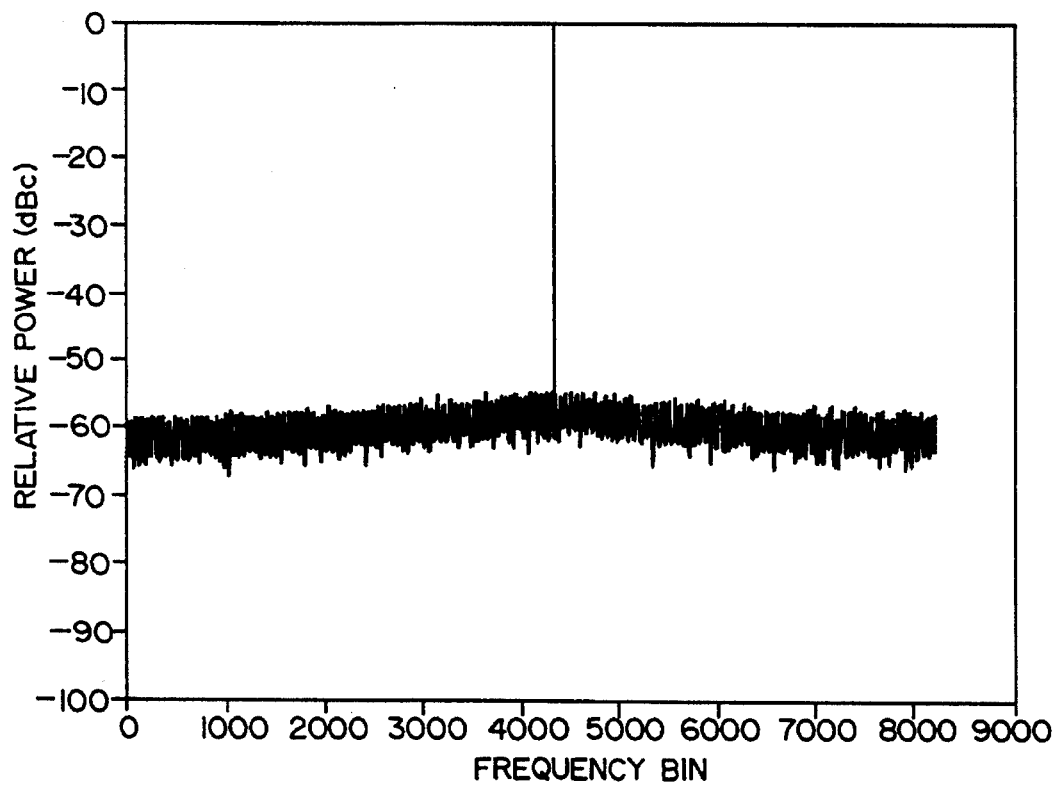
FIG. 11 is a graphical representation of a power spectrum of a 5-bit phase-truncated sine wave with second-order phase dithering.

FIG. 11 shows the same example using second-order (M=2) dithering using the sum of two uniform deviates. While the spectrum in FIG. 10 shows the residual spurs at −12 dBc per bit due to second-order effects, FIG. 11 shows no visible spurs, indicating better than −63 dBc spurious performance. Additional simulations involving Megapoint FFTs and not represented by Figures confirm the −18 dBc per bit performance of the second-order phase-dithered system.

Figure 12:
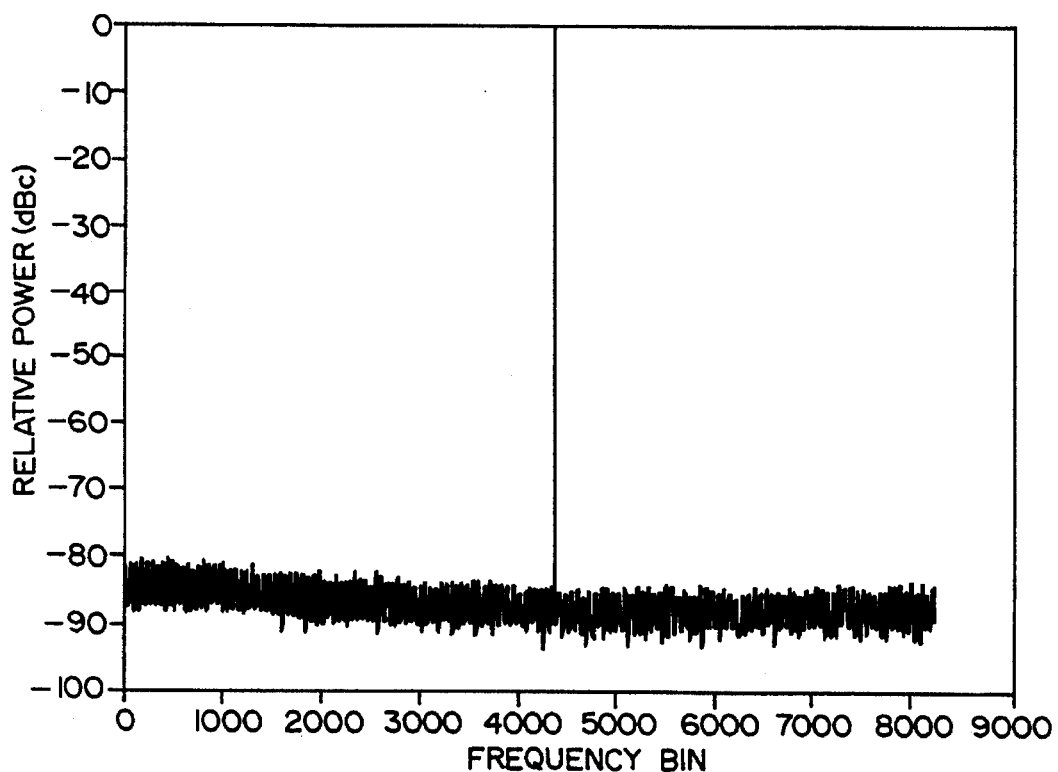
FIG. 12 is a graphical representation of a worst-case power spectrum of a sinusoid with first-order phase dithering and amplitude dithering.

Finally, FIG. 12 shows a worst-case result for first-order phase dithering together with first-order amplitude dithering. The amplitude samples are truncated to 8 bits, as are the phase samples. Note that the spurs are not visible in the spectrum; however, close analysis has demonstrated that they are present at the −88 dBc level expected due to second-order effects.

A SYSTEM DESIGN EXAMPLE

Figure 13:
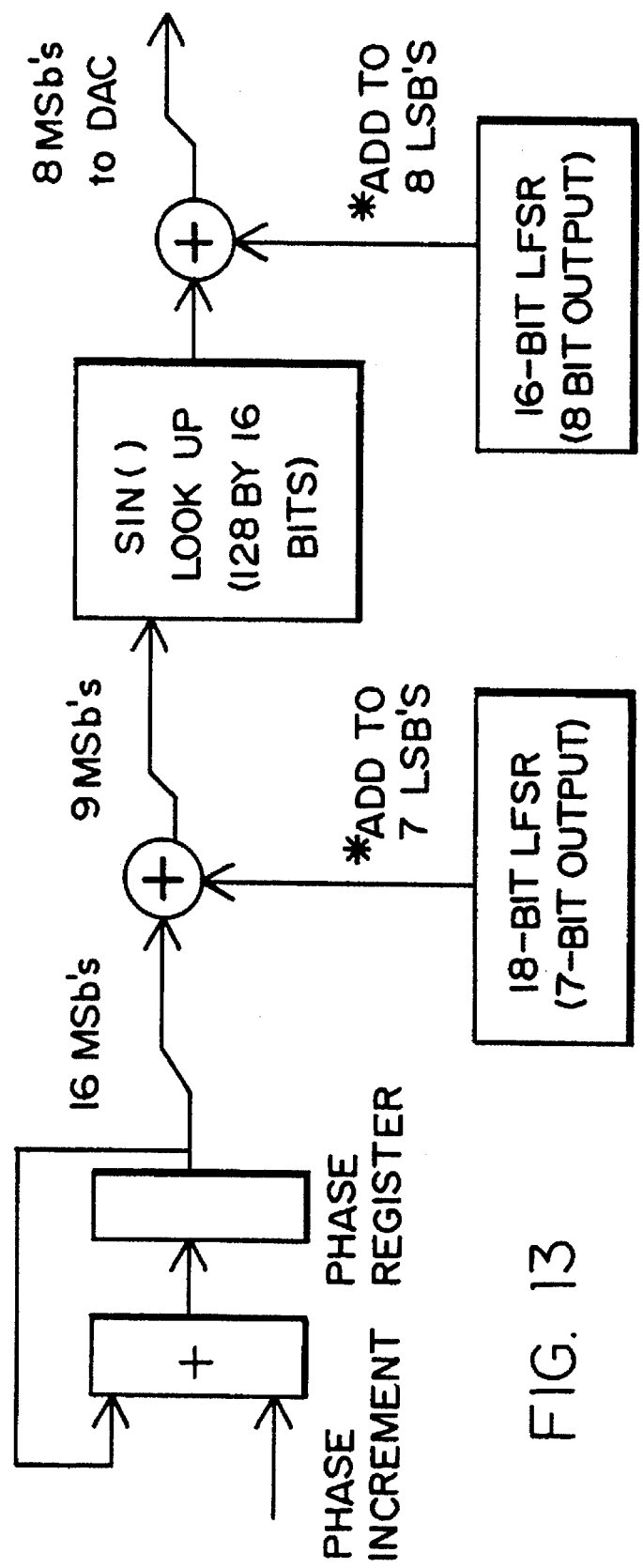
FIG. 13 is a block diagram of a spur-reduced direct digital frequency synthesizer in accordance with an embodiment of the present invention.

The block diagram of a direct digital frequency synthesizer based on the techniques presented here is shown in FIG. 13. The following system would perform at a sampling rate of 160 MHz, producing 8-bit digital sinusoids spur-free to −90 dBc with better than −120 dBc/Hz noise power spectral density. The system parameters are as follows:

Phase bits are in unsigned fractional cycle representation with:
  phase accumulator word-length determined by frequency resolution, and
  ≧16 bits prior to addition of 1 uniform phrase dither variate, with ≧9 bits after dither addition and truncation;

Amplitude look-up-table with:
  ≧$2^7$=128 entries (using quadrant symmetries of ≧16 bits each normalized so that the sinusoid amplitude equals 512 16-bit quantization steps less than the full-scale value;

Linear feedback shift register PN generator with ≧16 lags producing one 8-bit amplitude dither variate, and One LFSR PN generator with ≧18 lags for generation of the 7-bit phase dither variate.

CONCLUSION

A digital dithering approach to spur reduction in the generation of digital sinusoids has been presented. A class of periodic dithering signals has been analyzed because of its similarity to LFSR PN generators.

The advantage gained in amplitude dithering provides for spur performance at the original longer word length in an ideal system when the digital dithering signal is white noise distributed evenly, not uniformly, over one quantization interval. The reduced word length allows the use of fast, coarse-resolution, highly-linear digital-to-analog converters (DACs) to obtain sinusoids or other periodic waveforms whose spectral purity is limited by the DAC linearity, not its resolution. These results suggest that coarsely quantized, highly-linear techniques for digital-to-analog conversion such as delta-sigma modulation would be useful in direct digital frequency synthesis of analog waveforms.

The advantage gained in the proposed method of phase dithering provides for an acceleration beyond the normal 6 dB per bit spur reduction to a 6 (M+1) dB per bit spur reduction when the dithering signal consists of M uniform variates. Often the most convenient way to generate a periodic waveform is by table look-up with a phase index. Since the size of a look-up table is exponentially related to the number of phase bits, this can provide a dramatic reduction in the complexity of NCO's, frequency synthesizers, and other periodic waveform generators.

The advantages of dithering come at the expense of an increased noise content in the resulting waveform. However, the noise energy is spread throughout the sampling bandwidth. In high bandwidth applications, dithering imposes modest system degradation. It has been shown that high performance synthesizers with dramatically reduced complexity can be designed using the dithering method, without resulting in high noise power spectral density levels.

Having thus described the invention in exemplary form, what is claimed is:

1. An apparatus for generating a digital sinusoid signal having reduced spurious signal content; the apparatus comprising:

means for generating a digital sinusoid having a phase sample value and an amplitude sample value at an instant in time;

a digital random noise signal generator;

means for summing said noise signal with a parameter of said digital sinusoid to produce an N-bit word; and means for changing the wordlength of said N-bit word to produce an M-bit word where M is less than N;

wherein said digital sinusoid parameter is said amplitude sample value of said sinusoid.

2. An apparatus for generating a digital sinusoid signal having reduced spurious signal content; the apparatus comprising:

means for generating a digital sinusoid having a phase sample value and an amplitude sample value at an instant in time;

a digital random noise signal generator;

means for summing said noise signal with a parameter of said digital sinusoid to produce an N-bit word; and means for changing the wordlength of said N-bit word to produce an M-bit word where M is less than N;

wherein said noise signal is summed with said phase sample value; said apparatus comprising a second digital random noise signal generator and means for summing said second noise signal with the amplitude sample value of said truncated M-bit word.

3. The apparatus recited in claim 2 further comprising an amplitude look-up-table for generating said amplitude sample value corresponding to said phase sample value.

4. The apparatus recited in claim 2 wherein said noise signal is the sum of K separate noise signals where K>1.

5. An apparatus for generating a digital sinusoid signal having reduced spurious signal content; the apparatus comprising:

means for generating a digital sinusoid having a phase sample value and an amplitude sample value at an instant in time;

a digital random noise signal generator;

means for summing said noise signal with a parameter of said digital sinusoid to produce an N-bit word; and means for changing the wordlength of said N-bit word to produce an M-bit word where M is less than N;

wherein said noise signal is the sum of K separate noise signals where K>1.

6. A method for generating a digital sinusoid signal having reduced spurious signal content; the method comprising the steps of:

a) generating a digital sinusoid having a phase sample value and an amplitude sample value at an instant in time;

b) generating a digital random noise signal;

c) summing said noise signal with a parameter of said sinusoid; and d) reducing the length of the sum resulting from step c);

wherein step c) is performed by summing said noise signal with the amplitude value of said sinusoid.

7. A method for generating a digital sinusoid signal having reduced spurious signal content; the method comprising the steps of:

a) generating a digital sinusoid having a phase sample value and an amplitude sample value at an instant in time;

b) generating a digital random noise signal;

c) summing said noise signal with a parameter of said sinusold; and d) reducing the length of the sum resulting from step c);

wherein step c) is performed by summing said noise signal with the phase sample value of said sinusoid, the method further comprising the steps of generating a second digital random noise signal and summing said second noise signal with the amplitude sample value of said sinusoid.

8. The method recited in claim 7 further comprising the steps of providing an amplitude look-up-table and generating said amplitude sample value from said phase sample value using said look-up-table.

9. The method recited in claim 7 wherein step b) comprises the step of summing K separate noise signals where K>1.

10. A method for generating a digital sinusoid signal having reduced spurious signal content; the method comprising the steps of:

a) generating a digital sinusoid having a phase sample value and an amplitude sample value at an instant in time;

b) generating a digital random noise signal;

c) summing said noise signal with a parameter of said sinusoid; and d) reducing the length of the sum resulting from step c);

wherein step b) comprises the step of summing K separate noise signals where K>1.

* * * * *